US012684366B2

(12) United States Patent　　　　(10) Patent No.: US 12,684,366 B2
Sayed Hassan et al.　　　　　　　　(45) Date of Patent: Jul. 14, 2026

(54) DYNAMIC SPECTRUM SHARING OVERHEAD IMPACT MITIGATION

(71) Applicant: Nokia Technologies Oy, Espoo (FI)

(72) Inventors: Mohamad Sayed Hassan, Paris (FR); Louis Madier, Les Ulis (FR); Karri Markus Ranta-Aho, Espoo (FI)

(73) Assignee: Nokia Technologies Oy, Espoo (FI)

( * ) Notice: Subject to any disclaimer, the term of this patent is extended or adjusted under 35 U.S.C. 154(b) by 283 days.

(21) Appl. No.: 18/703,596

(22) PCT Filed: Oct. 22, 2021

(86) PCT No.: PCT/EP2021/079345
§ 371 (c)(1),
(2) Date: Apr. 22, 2024

(87) PCT Pub. No.: WO2023/066499
PCT Pub. Date: Apr. 27, 2023

(65) Prior Publication Data
US 2024/0422567 A1　　Dec. 19, 2024

(51) Int. Cl.
*H04W 16/14*　　(2009.01)
*H04L 5/00*　　(2006.01)

(52) U.S. Cl.
CPC .......... *H04W 16/14* (2013.01); *H04L 5/0053* (2013.01)

(58) Field of Classification Search
CPC .... H04W 16/14; H04W 88/06; H04L 5/0053; H04L 5/0064; H04L 5/0073; H04L 5/005
See application file for complete search history.

(56) References Cited

FOREIGN PATENT DOCUMENTS

WO　WO-2020236589 A1 * 11/2020　.............. H04W 4/70
WO　WO-2020261095 A1 * 12/2020　........ H04W 28/0252
WO　WO-2021033115 A1 * 2/2021　............ H04W 72/23

* cited by examiner

*Primary Examiner* — Ayanah S George
(74) *Attorney, Agent, or Firm* — Barta Jones, PLLC

(57) ABSTRACT

Systems, methods, apparatuses, and computer program products for overhead impact mitigation in dynamic spectrum sharing are provided. For example, a method may include informing, by a network element, a user equipment regarding at least one resource configured to a reference signal for a second radio access network. The user equipment may be configured to operate in a first radio access network different from the second radio access network. The informing may include indicating that the user equipment is permitted to use the reference signal. The method may also include transmitting the reference signal in the second radio access network using the at least one resource.

20 Claims, 8 Drawing Sheets

NR slot without spectrum sharing

DMRS estimated H$_1$

DMRS estimated H$_2$

Data channel estimation
is a linear interpolation
between H$_1$ and H$_2$

Functional level. CE smoothing
is not shown here $$H_1 = \frac{H_2 - H_1}{l_2 - l_1} (1 - l_1) + H_1$$

DSS cell                                                              NR UE

Semi-static configuration

Configurations for solution#2
(RRC new parameters in NZP-CSI-RS-ResourceSet)

For each configured slot

Solution#2 activation
(1 new bit in DCI)

Use LTE CRS as NR CSI-RS

DYNAMIC SPECTRUM SHARING OVERHEAD IMPACT MITIGATION

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for providing overhead impact mitigation in dynamic spectrum sharing.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to an apparatus. The apparatus may include at least one processor and at least one memory including computer program instructions. The at least one memory and the computer program instructions can be configured to, with the at least one processor, cause the apparatus at least to perform informing, by a network element, a user equipment regarding at least one resource configured to a reference signal for a second radio access network. The user equipment can be configured to operate in a first radio access network different from the second radio access network. The informing can include indicating that the user equipment is permitted to use the reference signal. The at least one memory and the computer program instructions can also be configured to, with the at least one processor, cause the apparatus at least to perform transmitting the reference signal in the second radio access network using the at least one resource.

An embodiment may be directed to an apparatus. The apparatus may include at least one processor and at least one memory including computer program instructions. The at least one memory and the computer program instructions can be configured to, with the at least one processor, cause the apparatus at least to perform receiving, at a user equipment from a network element, information regarding at least one resource configured to a reference signal for a second radio access network. The user equipment can be configured to operate in a first radio access network different from the second radio access network. The information can indicate that the user equipment is permitted to use the reference signal. The at least one memory and the computer program instructions can also be configured to, with the at least one processor, cause the apparatus at least to perform receiving the reference signal in the second radio access network using the at least one resource.

An embodiment may be directed to a method. The method may include informing, by a network element, a user equipment regarding at least one resource configured to a reference signal for a second radio access network. The user equipment may be configured to operate in a first radio access network different from the second radio access network. The informing may include indicating that the user equipment is permitted to use the reference signal. The method may also include transmitting the reference signal in the second radio access network using the at least one resource.

An embodiment may be directed to a method. The method may include receiving, at a user equipment from a network element, information regarding at least one resource configured to a reference signal for a second radio access network. The user equipment may be configured to operate in a first radio access network different from the second radio access network. The information can indicate that the user equipment is permitted to use the reference signal. The method may also include receiving the reference signal in the second radio access network using the at least one resource.

An embodiment may be directed to an apparatus. The apparatus may include means for informing, by a network element, a user equipment regarding at least one resource configured to a reference signal for a second radio access network. The user equipment can be configured to operate in a first radio access network different from the second radio access network. The informing can include indicating that the user equipment is permitted to use the reference signal. The apparatus can also include means for transmitting the reference signal in the second radio access network using the at least one resource.

An embodiment may be directed to an apparatus. The apparatus may include means for receiving, at a user equipment from a network element, information regarding at least one resource configured to a reference signal for a second radio access network. The user equipment can be configured to operate in a first radio access network different from the second radio access network. The information can indicate that the user equipment is permitted to use the reference signal. The apparatus may also include means for receiving the reference signal in the second radio access network using the at least one resource.

BRIEF DESCRIPTION OF THE DRAWINGS

For proper understanding of example embodiments, reference should be made to the accompanying drawings, wherein.

DETAILED DESCRIPTION

Figure 1:
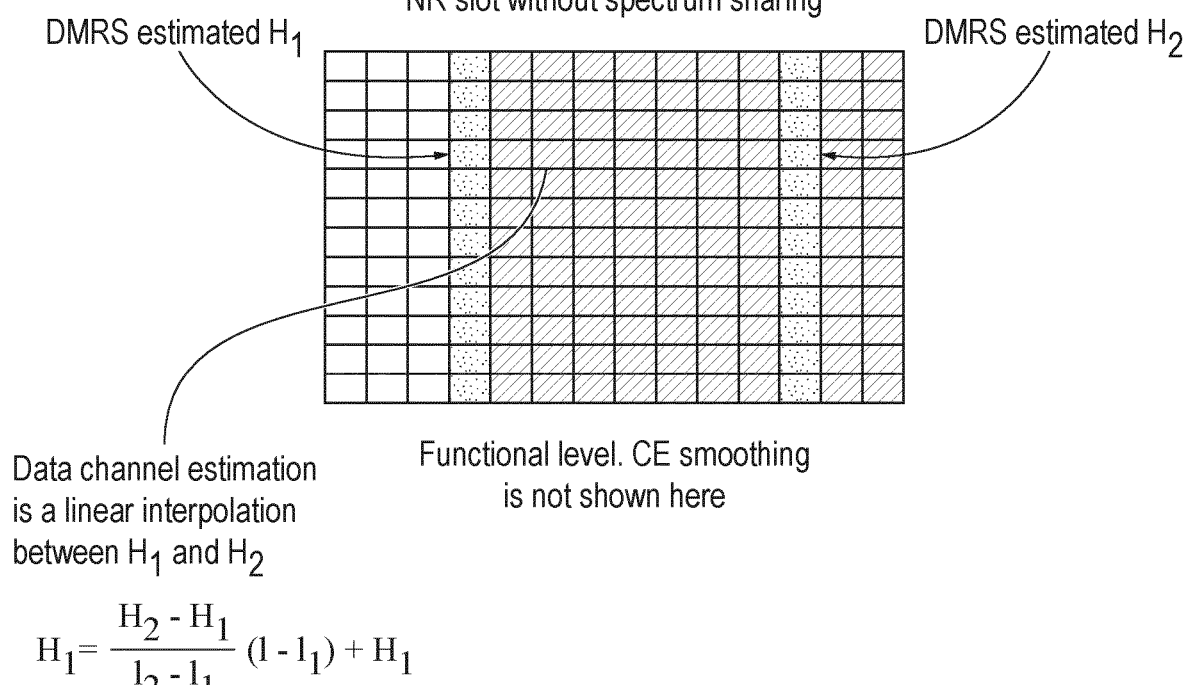
FIG. 1 illustrates channel estimation using linear interpolation.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for providing overhead impact mitigation in dynamic spectrum sharing, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Certain embodiments may have various aspects and features. These aspects and features may be applied alone or in any desired combination with one another. Other features, procedures, and elements may also be applied in combination with some or all of the aspects and features disclosed herein.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain embodiments relate to dynamic spectrum sharing. More particularly, certain embodiments relate to mitigation of impact of dynamic spectrum sharing on radio traffic associated with new radio (NR). For example, certain embodiments may mitigate negative impacts of cell-specific reference signal (CRS) rate matching (RM) dynamic spectrum sharing (DSS) overhead. Certain embodiments may provide methods and systems that may enhance the performance of new radio (NR) user equipment (UEs) by exploiting the long term evolution (LTE) cell-specific reference signal (CRS) resources.

Dynamic spectrum sharing may permit operation of LTE and NR networks in the same frequency bands. For example, DSS may allow operation of LTE and NR networks in the same frequency bands in interleaved fashion. DSS may allow for evolution of mobile networks towards fifth generation (5G)/NR, by optimizing the use of network resources. For example, DSS may be helpful when LTE networks are still in service and while NR UEs' existence in the network is low with respect to LTE UEs. As another example, DSS may be helpful when granting dedicated spectrum for NR is not possible yet, for example due to regulation, re-farming, and/or auction ongoing processes.

Dynamic spectrum sharing may affect LTE UEs and NR UEs, as well UEs that are both LTE and NR.

In some approaches, the resources occupied by the LTE CRS are reserved in the NR cell. The NR UE in the NR cell cannot use the LTE CRS resources for anything due to configuration by the NR cell in these approaches. Instead, they are just overhead allocated for LTE operation. Thus, these approaches may impose an overhead impact in a dynamic spectrum sharing. Certain embodiments may avoid or reduce such overhead impact.

It may be helpful to understand DSS and channel estimation in NR and LTE systems. NR cells can deal with neighboring LTE cells always on CRS using CRS-RM. Specification at the physical resource block (PRB) level exist since release 15 (Rel-15) and specifications enabling this at the resource element (RE) level exist since release 16 (Rel-16), in addition to the CRS-RM against collocated LTE CRS in RE level that exists since Rel-15. For CRS-RM, the serving cell scheduler can use a rate matching algorithm to not place any NR data on the resource elements carrying LTE CRS either of the cell itself when it additionally supports LTE traffic, which can also be referred to as a CRS-RM DSS feature, and/or of one or more neighboring cells. Certain embodiments discussed herein may relate to the CRS-RM DSS feature.

The network can send semi-static information/configuration to the UE as reserved resources, and the NR physical downlink shared channel (PDSCH) can be rate matched around those reserved resources.

For LTE UE, CRS signals can be used for channel estimation and the estimation of covariance matrix of interference plus noise for data and control channel demodulation purposes. Inaccurate estimations may degrade the demodulation performance of the LTE UE. The CRS signals can also be used for computing measurements such as reference signal received power (RSRP), reference signal received quality (RSRQ), channel quality indicator (CQI), performance indicator (PI)/precoding matrix indicator (PMI). The LTE UE can report the computed measurements back to the LTE serving cell. Inaccurate measurements reports may degrade the performance of link adaptation. As a result, the overall cell throughput may decrease and traffic delays may increase.

For NR UE, DMRS signals can be used for channel estimation and the estimation of covariance matrix of interference plus noise for data and/or control channel demodulation purposes. More accurate estimations may improve the demodulation performance of the NR UE. In NR there can be a different DMRS for data and control, each dedicated for that particular channel's demodulation. In LTE there may be a single CRS that can be used for both data and control demodulation.

For NR UE, CSI-RS signals can be used for carrier time and phase tracking together with primary synchronization signal (PSS) and secondary synchronization signal (SSS). The CSI-RS signals can also be used for computing measurements, such as RSRP, RSRQ, CQI, and PMI, for reporting to the NR serving cell.

A frame where cell-specific reference signal rate matching dynamic spectrum sharing is active can have shared spectrum, such that some portions are reserved for LTE, while other areas are shared between LTE and NR. Various resources can include, without limitation, LTE physical downlink control channel (PDCCH), LTE CRS, LTE physical downlink shared channel (PDSCH), NR synchronization signal block (SSB), NR CSI-RS, NR PDCCH control resource set (CORESET), NR PDSCH demodulation reference signal (DMRS), NR but not used as these REs may be used to transmit NR PDSCH DMRS to another NR UE in a Multi-User MIMO (MU-MIMO) transmission, NR tracking reference signal (TRS), and NR PDSCH. These are by way of example only, and describe an approach that can be used for DSS.

The network can send semi-static information/configuration to the NR UE about reserved resources where NR PDSCH could be rate matched. Without certain embodiments, the NR UE may be unable to know what type of transmission is happening on these reserved resources. In such approaches, the only thing the UE may know is that these reserved resources are not going to be containing any information for the UE. The reserved resources can be identified to the UE using radio resource control (RRC) configuration, for example as described in 3GPP technical specification (TS) 38.331. In that specification, the configuration can include an information element, RateMatchPatternLTE-CRS, which may identify a carrier frequency, carrier bandwidth for DL, and other aspects of the configuration detailing the time and frequency location of each LTE CRS resource element in an NR carrier.

The serving DSS cell may be free to use the reserved resources. For example, the serving DSS cell may use the reserved resources for broadcasting CRS signals to the cell's LTE UEs, for such UEs to do measurements, or the serving DSS cell may use the reserved resources to broadcast its SSB/PBCH signals and channels. Without certain embodiments, an NR UE may be unable to assume anything about the transmission on these reserved resources, but instead may simply assume that the NR slots have resource elements not to be used for NR PDSCH transmission. For example, the UE in such approaches may assume that NR slots overlapping with LTE slots marked as multicast-broadcast single-frequency network (MBSFN) subframes, for example listed in mbsfn-SubframeConfigList in the RRC structure, have LTE MBSFN subframe CRS pattern that the NR PDSCH will not be mapped on. Likewise, in such approaches the UE may assume that NR slots overlapping with LTE slots not marked as MBSFN subframes have "normal" LTE subframe CRS pattern that the NR PDSCH will not be mapped on.

When these reserved resources are configured to the NR UE, they may not be available for any NR transmission, which may be an example of overhead.

The LTE CRS resources can occupy resources that, without sharing, would be NR resources allocated to data NR. The number of LTE CRS reserved for the cases of 1, 2 or 4 antenna ports CRS can be summarized in terms of the number of resource elements (REs) for CRS per physical resource block (PRB) per LTE sub-frame, or per NR slot, $N_{CRS}$. There may be 168 REs per LTE sub-frame, or per NR slot, in one PRB. In the case of 1 antenna port CRS, $N_{CRS}$ may be 6 distributed CRS REs over 14 orthogonal frequency division multiplexed (OFDM) symbols (one LTE sub-frame or one NR slot). In the case of 2 antenna ports CRS, $N_{CRS}$ may be 16 distributed CRS REs over 14 OFDM symbols. In the case of 4 antenna ports CRS, $N_{CRS}$ may be 24 distributed CRS REs over 14 OFDM symbols. The overhead of CRS transmitted in LTE can be computed as follows for one NR slot of 14 OFDM symbols:

$$CRS \text{ overhead} = \frac{N_{CRS}}{168}.$$

Thus, if N is 24 and there are 4 antenna ports, the overhead ratio may be around 14%.

Without certain embodiments, in CRS-RM DSS scenarios, the NR UE in the NR cell cannot use the LTE CRS resources for anything. Instead, those resources may just be treated as overhead from the NR cell's perspective, and allocated for LTE operation.

Certain embodiments provide a method and system that can exploit resources that, from an NR traffic perspective, are otherwise wasted. Thus, in certain embodiments the LTE CRS can be used in addition to, or instead of NR CSI-RS for the various purposes that NR CSI-RS can be used. Accordingly, certain embodiments may use signaling that would otherwise be considered overhead to improve the throughput of NR traffic by improving the channel estimation of the UEs co-scheduled with LTE CRS signals in the same slot by the same cell.

The LTE CRS resources may be broadcasted and transmitted over the entire bandwidth as specified by LTE standards, even when no LTE UEs are currently scheduled. Thus, as the ratio of LTE UEs to NR UEs declines, these resources may increasingly be considered wasted from a network perspective.

In certain embodiments, the CRS of LTE can still be used to serve the LTE UEs and can also be further used by NR UEs to enhance the NR UEs' DMRS-based channel estimation without requiring any new reference signal and without requiring the UE to do wideband channel estimation. For example, the UE may not need to do channel estimation for resources that are not assigned to the UE's PDSCH channel.

Certain embodiments may be provided in various implementations. In certain embodiments, the LTE and NR transmissions may be from the same set of antenna ports, and the phase coherence of the two may be guaranteed by the gNB. These signal characteristics may permit at least two alternatives that can be used alone or in combination. According to a first technical approach, which can also be considered a first option, a NR UE can use the LTE CRS to enhance the channel estimation-based NR demodulation reference signal (DMRS) for, for example, PDSCH. In this way, the NR UEs may benefit from LTE CRS, even when not used by LTE UEs. Using the LTE CRS by NR UE for channel estimation may permit reduction in the utilization of additional DMRS for NR transmission in scenarios of high-speed NR UEs, which may lead to higher throughput. Additionally, or alternatively, such use of the LTE CRS may enhance the NR PDSCH demodulation performance, which may also lead to higher throughput.

According to a first technical approach, which can also be considered a first option, a NR UE can use the LTE CRS in addition or instead of the native NR CSI-RS signals. Thus, the NR UE may benefit from the LTE CRS. For example, this use of the LTE CRS may allow reduction in cell signaling overhead and/or may enable fast secondary cell (SCell) activation.

There may be various ways in which the use of LTE CRS in addition or instead of the native NR CSI-RS signals may reduce the cell signaling overhead. For example, the LTE CRS can serve as NR CSI-RS for tracking (TRS), eliminating the need for separate CSI-RS for tracking and reducing the cell overhead. Even if the NR cell is a beamforming cell that uses different beams to transmit the NR PDSCH and thus also beamforms the CSI-RS for Beam Management (BM) and Channel Acquisition, the CSI-RS for tracking may not need to be beamformed for it to be usable for tracking.

Additionally or alternatively, the LTE CRS can serve as CSI-RS for channel acquisition. In this case, the UE can measure the channel state criteria requested by the network based on the LTE CRS broadcast to the cell.

In another aspect, if CSI-RS for tracking is transmitted for NR UEs that are not in RRC connected, and the NR cell is a DSS cell also carrying LTE CRS, using LTE CRS for such tracking purposes may avoid the additional overhead of yet another always-on RS to be continuously transmitted in the cell.

The use of LTE CRS in addition or instead of the native NR CSI-RS signals may also or additionally permit fast SCell activation. For example, the LTE CRS can serve as temporary RS for fast SCell activation. The CSI-RS signal may ensure that the UE has a reference signal as fast as possible to synchronize to the newly activated SCell. The LTE CRS may always be present and readily available and thus no additional CSI-RS as temporary RS to facilitate fast SCell activation would be needed in this case.

In certain embodiments, a network may select between the first technical approach and the second technical approach described above, rather than using both technical approaches together. The choice, if such a choice is made, may be done by a serving cell and may be based on the use cases of its connected NR UEs. For example for high speed UEs the first technical solution could be used while for low speed UEs the second technical solution could be used since channel variation is not so high and a single DMRS could do a good job alone in channel estimation. As another example, the second technical approach can be used to enable fast SCell activation for UEs with high priorities that may ask for high real time traffic.

Various techniques and systems may be applied to permit a new radio UE to benefit from the CRS broadcast by an LTE cell. For example, it may be helpful for the NR UE to know that the LTE cell broadcasts the CRS, as well as the details of the CRS pattern the CRS is transmitted with. For example, it may be helpful for the NR UE to know the parameters needed for the generation of the CRS sequence to allow the channel estimation-based CRS. Furthermore, it may be helpful for the NR UE to apply the LTE CRS for channel estimation in addition to NR channel estimation filter, depending on UE capability.

The control signaling between DSS cell and NR UE can be enhanced correspondingly. For example, the NR UE can be configured for either of the via new RRC information elements. In certain embodiments, a DCI bit can activate one of the above-described technical approaches.

In NR DL, the raw channel estimates may be derived from the DMRS signals for PDSCH. For single user (SU) multiple-input multiple-output (MIMO), one front loaded (FL) DMRS may be used. For high speed UE, additional DMRS signals may be needed to guarantee performance for high modulation and coding scheme (MCS) indices, for example for better channel estimation and frequency offset compensation.

Signaling can be used to communicate the resources allocated/configured to CRS that are broadcasted by LTE cell. Similarly, signaling can be used to communicate the parameters to generate the CRS sequence in order to allow the channel estimation-based CRS.

FIG. 1 illustrates channel estimation using linear interpolation. FIG. 1 presents an example of channel estimation using linear interpolation in time, between OFDM symbol. When the speed is high enough, the channel may be varying fast and thus the channel estimated at a first front loaded DMRS, in this example symbol 3, may not be able to be applied to later symbols in the slot, such as symbol 12 and 13. To have accurate channel estimation, one additional DMRS, in this example symbol 11, can be added. Thus, linear interpolation may be applied between the two DMRS signals to estimate the channel for data symbols. In this example, there is one FL DMRS and one additional DMRS, although more complex implementations are permitted. Channel estimation smoother at the frequency domain is not shown in FIG. 1, for simplicity.

On one hand, more DMRS signals in additional OFDM symbols may allow better channel estimation and thus better performance at the UE side. On the other hand, more DMRS may consume more resources from data symbols and thus more DL overhead.

Additional DMRS may be considered for scenarios where speed is expected to be higher than some threshold, such as 30 Km/h. Such speed may be expected in NR cells covering roads or streets. In dense urban environments, where pedestrian usage may be dominant, one front loaded DMRS may be configured. Thus, minimizing the number of additional DMRS while ensuring good channel estimates may be beneficial in NR system design.

In a NR DL DSS scenario, in addition to DMRS, the LTE CRS may also consume resources. Moreover, there may be additional overhead in a DSS scenario.

At the base station side, the LTE cell may broadcast the CRS. Additionally, NR PDSCH scheduled by NR cell may consider the LTE CRS overhead in rate-matching.

At the UE side, the rate-matching applied at the NR UE may discard the resources that can be allocated as LTE CRS resources, without certain embodiments.

In certain embodiments, the LTE CRS resources can be considered at the UE side to improve the channel estimation. In another embodiment, the LTE CRS resources can be considered at the UE side to reduce the number of additional DMRS.

The CSI-RS signals may be transmitted both periodically as well as aperiodically, when needed. The CSI-RS may be seen as an overhead to the NR system. Different from LTE CRS that is not used for any purpose, from the perspective of the NR UE, the CSI-RS can be an overhead that is utilized for different purposes and that are a necessary part of the system operation.

CSI-RS for tracking, which can be a tracking reference signal (TRS), can be used for the UE to maintain time and phase synchronization to the carrier the gNB transmits. In LTE, the CRS can serve this purpose.

CSI-RS can be used for channel acquisition measurement, based on which the NR UE can send CSI reports that can be used to determine the downlink scheduling decisions, such as modulation order, MIMO rank, channel coding rate and frequency location of the transmission. In LTE the CRS can serve this purpose.

A temporary RS, for example an aperiodic CSI-RS, can be used to facilitate fast activation of an SCell that has been deactivated If the LTE cell and the NR cell share the same transmit antennas then the LTE and NR cell may need to be accurately time and frequency synchronized for the LTE's transmitted CRS to correspond closely to the REs the NR cell leaves unused in the middle of the NR PDSCH transmissions when it uses the LTE CRS RM functionality.

The CRS resources can be distributed over different OFDM symbols which is not the DMRS pattern that are located in per OFDM symbol. Thus exploiting the LTE CRS pattern can achieve an enhancement of the DMRS channel estimation, which can yield NR UE performance improvement.

Additional DMRS and CRS may vary from a resource consumption point of view, depending on the number of antenna ports used. For one Front Loaded DMRS (DMRS symbol before the data it is meant to help demodulate) and one additional DMRS with one antenna port for DMRS and CRS, the consumption may be twelve REs, six on one symbol and six on the other. For one FL DMRS and CRS with one antenna port for DMRS and CRS, the consumption may be twelve REs, six on one symbol and six on the other, with six of the REs being DRMS REs and the other six of the REs being distributed CRS over the OFDM symbols. For one FL DMRS and one additional DMRS with two antenna ports for DMRS and CRS, the consumption may be twelve REs, six on one symbol and six on the other. For one FL DMRS and CRS with two antenna ports for DMRS and CRS, the consumption may be eighteen REs, with six of the REs being DRMS REs and the other twelve of the REs being distributed CRS over the OFDM symbols.

In short, more distributed CRS resources may be available than DMRS resources for 2 antenna ports (DMRS Type-1 is assumed in this example). Using the higher density of LTE CRS could provide a good enhancement of DMRS channel estimation.

Based on the above discussion, it can be seen that at least a few advantages can be obtained from CRS to enhance DMRS channel estimation: distributed pattern of LTE CRS per PRB; high density of LTE CRS resources; and higher power of LTE CRS resources with respect to data NR PDSCH.

To benefit from CRS at NR side, the NR UE may be configured to know that the resources allocated/configured to CRS are broadcasted by LTE cell and can be used for a particular purpose. This can be achieved by configuration signaling. Moreover, the NR UE may be configured to know the parameters to generate the CRS sequence in order to allow the channel estimation-based CRS. This can be achieved by configuration signaling. Additionally, the NR UE can be configured to apply an LTE CRS filter for channel estimation in addition to NR channel estimation filter. This configuration to apply the LTE CRS filter may depends on UE capability. In case UE does not support the LTE CRS filter in NR L1, another option could be to build a virtual DMRS pilot from CRS resources in order to use the NR channel estimation filter DMRS. A further option could be that a capable UE uses deep learning-based channel estimation.

Figure 2A:
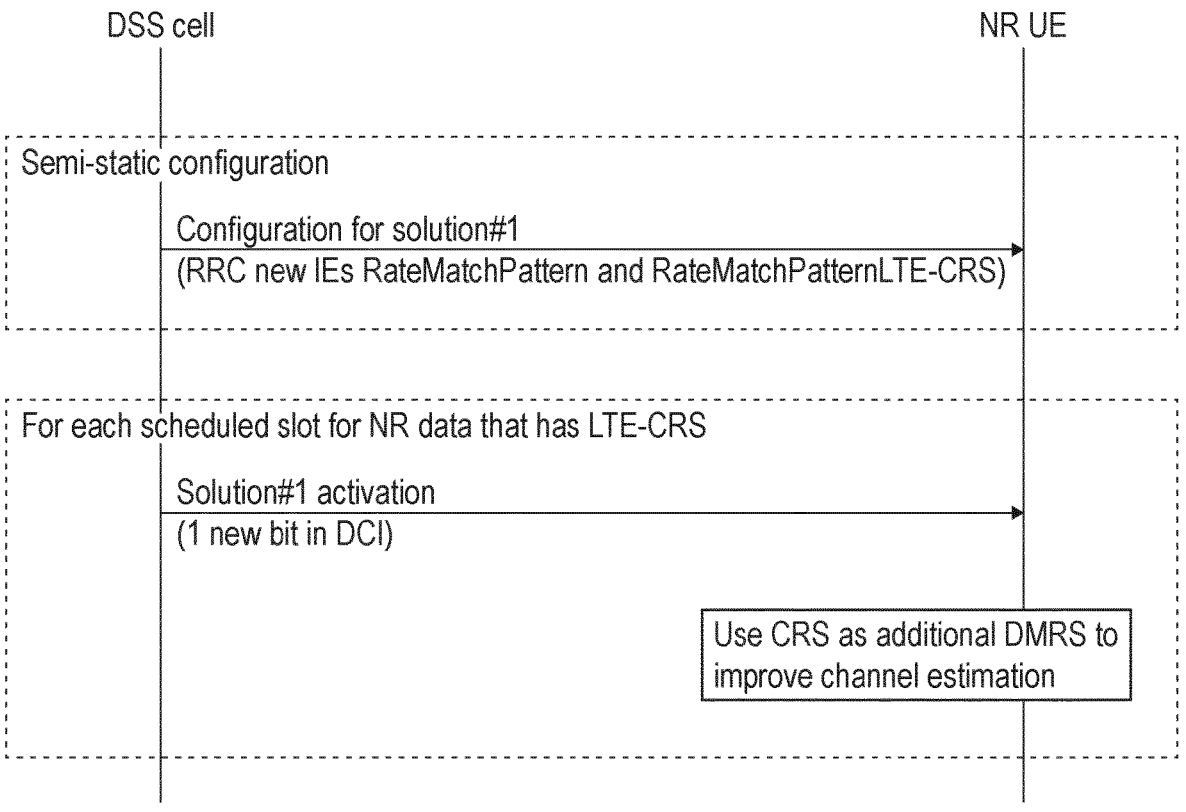
FIG. 2A illustrates a message sequence for a first technical approach, according to certain embodiments.

FIG. 2A illustrates a message sequence for a first technical approach, according to certain embodiments.

For CRS-RM DSS feature, the NR UEs can be configured with reserved resources at the PRB symbol level, for example two lists of RateMatchPattern for each DCI type, or RE level, for example one list of RateMatchPatternLTE- CRS. In both cases, the UEs may not know if the CRS is sent or not on these reserved resources. The UE may know that the UE is not to consider these resources and is to assume that PDSCH is rate matched around these resources when the UE is told so by its serving cell, for example through DCI messages.

Hence, in certain embodiments new signaling is needed to inform the UE about the presence of CRS and how to generate these resources.

As shown in FIG. 2A, the NR cell can send to the NR UE semi-static information/configuration needed to generate the LTE CRS signals and to know the REs where these signals are mapped, using RRC signaling for example. The information can include $$N_{cell}^{ID}$$

of the LTE cell to generate the LTE CRS sequence, as described in 3GPP TS 36.211, for example. The information can also include nrofCRS-Ports. The information could be added as additional IEs to RateMatchPattern and/or RateMatchPatternLTE-CRS. As another option, the information can be added to a new RRC configuration type.

A 1-bit information element (IE) can be added to downlink control information (DCI) to indicate to the UE to use or not the preconfigured parameters. In case dynamic configuration per MAC-CE is enabled to have adaptive DMRS configuration, based on the new flag, less additional DMRS can be configured.

To allow the DMRS channel estimation filter to be enhanced with CRS channel estimates, the number of ports for CRS may be set equal to or greater than the number of ports for DMRS. The LTE CRS can be broadcasted in a wider beam than the NR DMRS, which may allow the UE to receive the power of LTE CRS at a good level.

Certain embodiments may take various implementations without departing from the above-described principles. For example, the NR UE may have a capability to support channel estimation (CE) filters for LTE signals. In this case, the channel estimation based DMRS can be directly enhanced by LTE CRS raw channel estimates. Another implementation may be to consider joint channel estimation between NR DMRS CE filters and CRS CE filter.

In another implementation, NR UE may not able to support channel estimation (CE) filters for LTE signals. In this case, the raw CEs may be estimated for subcarriers where LTE CRS are broadcasted and adjacent resources using closest CE approach. The raw CRS CEs can be fed to the NR DMRS CEs to enable the DMRS CEs to enhance channel estimation.

In another implementation, the deep learning-based channel estimation capable UE can use the REs of DMRS and CRS as input to deep learning estimator. For example, a neural network or similar machine learning system may be employed.

Figure 2B:
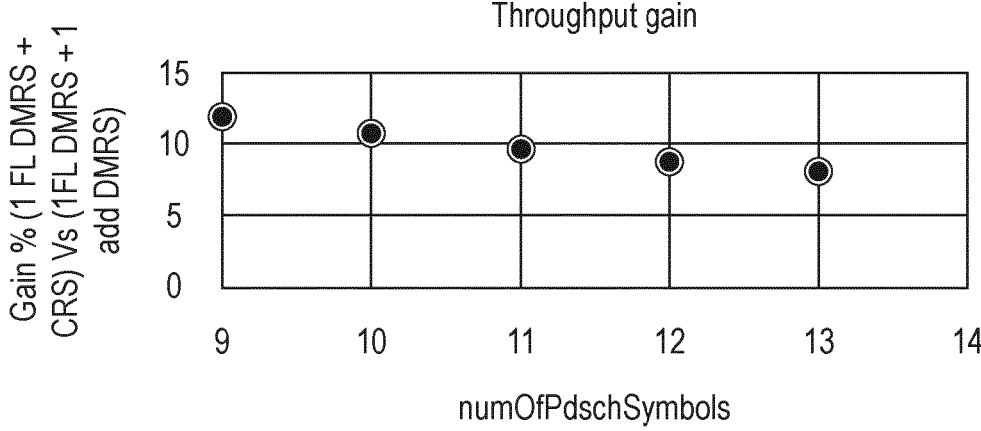
FIG. 2B illustrates throughput gain, according to certain embodiments.

FIG. 2B illustrates throughput gain, according to certain embodiments. As shown in FIG. 2B, using CRS for channel estimation may help to avoid using additional DMRS. Thus, more data OFDM symbols may be available. The maximum expected gain can be approximated as $$\frac{(N+1) * 12 - N_{CRS}}{N * 12 - N_{CRS}}$$

11 where N=numOfPdschSymbols can be the number of OFDM symbols scheduled for PDSCH transmission. $N_{CRS}$ can be the number of CRS resources per one PRB.

FIG. 2B illustrates analytical throughput gain percentage in the case of 1-port DMRS type-1 and 1-port CRS, $N_{CRS}$=6. Using CRS for channel estimation may allow enhancement of the DMRS channel estimation and thus improvement of the UE performance, for example better SINR estimate, better link adaptation, and the like.

Figure 3:
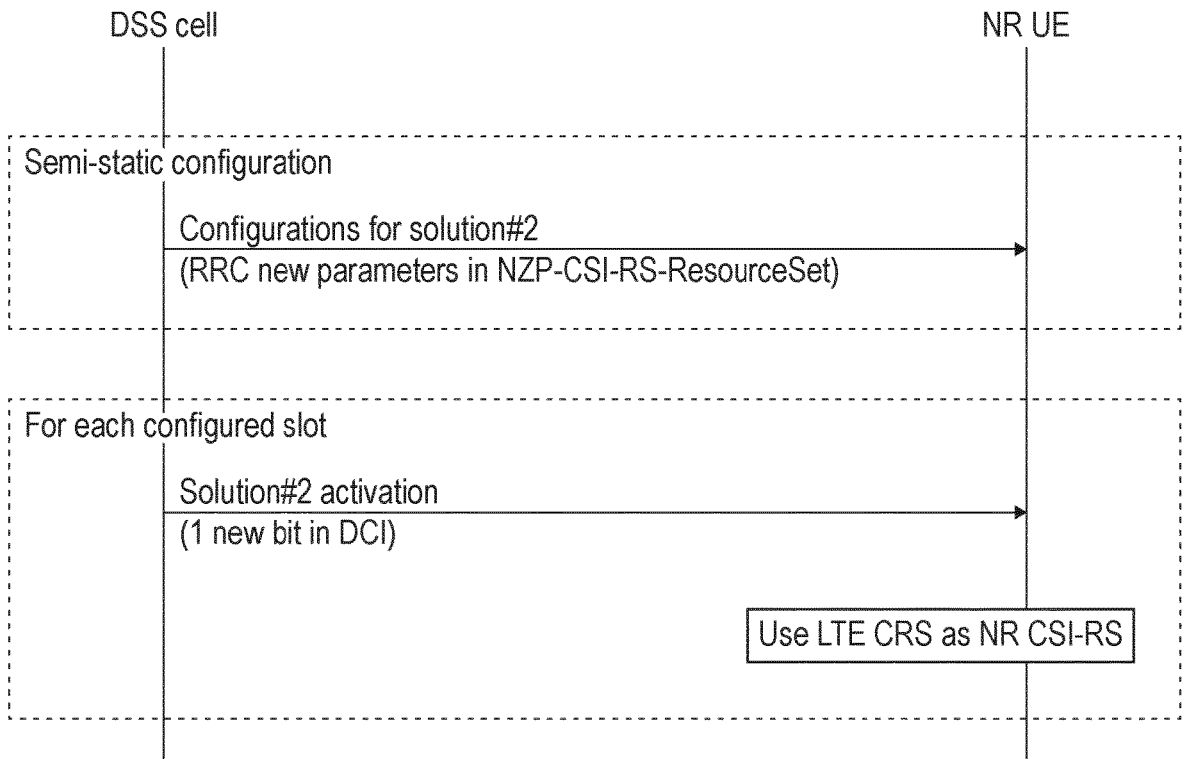
FIG. 3 illustrates a message sequence for a second technical approach, according to certain embodiments.

FIG. 3 illustrates a message sequence for a second technical approach, according to certain embodiments. The LTE CRS pattern may be known to the NR UEs in a DSS cell when they are RRC connected. In this technical approach, LTE CRS can serve as a substitute to the CSI-RS for tracking. An NR UE in RRC connected mode may expect to be configured with CSI-RS for tracking as NZP-CSI-RS-ResourceSet configured with trs-info in the RRC configuration. This configuration can be extended to indicate that the LTE CRS rate matching pattern-defined LTE CRS can be used as the tracking RS instead of a particular CSI-RS configuration.

The configuration may indicate which of the LTE CRS ports to use as the reference, or alternatively the UE can freely use one or more of the LTE CRS antenna ports for this purpose. This UE may not require the NR cell to transmit CSI-RS for tracking and the overhead of that signal can be eliminated.

Similarly, the LTE CRS can be used as a substitute to the CSI-RS for channel acquisition. An NR UE in RRC connected mode may be configured with a (multi-port) NZP-CSI-RS for it to measure the radio channel from the gNB to the UE and feedback the measurements to the gNB for instructed MCS and frequency selection. The CSI reporting configuration can point to the multi-port LTE CRS being usable for this purpose. The LTE CRS antenna port mapping to NR antenna ports can be provided either by configuration, or by specification.

Likewise, LTE CRS can serve as a substitute to the Temporary RS for fast SCell activation. When the UE with deactivated SCell is still in RRC connected, the UE may know the LTE CRS pattern, and the temporary RS configuration for the fast SCell activation feature may point to the LTE CRS as a temporary RS for that SCell without providing any CSI-RS configuration for that purpose.

Moreover, LTE CRS may serve as a CSI-RS for tracking (TRS) for UEs not in RRC connected. This approach may operate the same as the LTE CRS substitution in RRC connected, but the UE may be configured with the necessary information either in system information, or as dedicated configuration when the UEs are moved out of the RRC Connected state.

For CRS-RM feature, the NR UEs can be configured with reserved resources (see, for example, 3GPP TS 38.214 section 5.1.4) at the PRB symbol level (2 lists of RateMatch-Pattern for each DCI type) or RE level (one list of RateMatchPatternLTE-CRS). In both cases, the NR UEs may not know if the UEs' serving cell is sending CRS or any other signal on these reserved resources. Thus, in certain embodiments the NR UE can receive, in the case of RE level configuration, at least one bit to indicate to the NR UE whether there is an LTE CRS signal sent on these reserved resources. This bit can be included in DCI.

The UE can also be configured with PCI $$N_{cell}^{ID}$$

12 that the UE can use to generate the LTE CRS signal. The UE can also be configured with an identification of which elements from the list of RateMatchPatternLTE-CRS to consider, for example by RRC semi-static signaling.

In case of PRB symbol level configuration, the UE can configured using RRC semi-static signaling with a complete list of parameters. The UE can also be configured with the $$N_{cell}^{ID}$$

of LTE cell for generating the LTE CRS sequence, as described at section 6.10.1 of 3GPP 36.211, which explains an approach for CRS sequence generation.

The UE can also be configured with carrierFreqDL, carrierBandwidthDL, number of PRBs, nrofCRS-Ports, and v-Shift. The UE can further be configured with a bit to indicate to the NR UE that there is an LTE CRS signal sent on the reserved resources.

Figure 4:
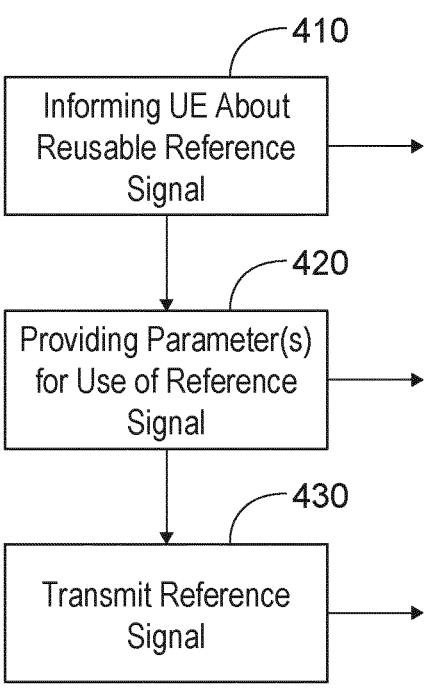
FIG. 4 illustrates a method according to certain embodiments.
Figure 5:
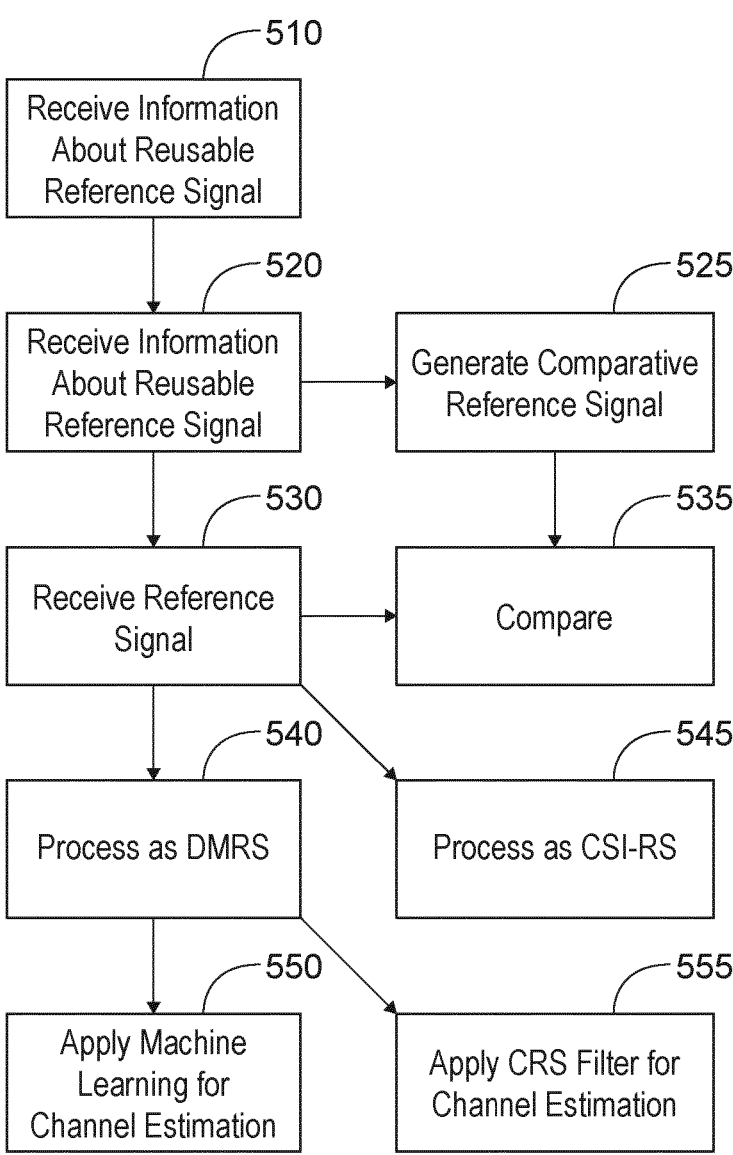
FIG. 5 illustrates a further method according to certain embodiments.

FIG. 4 illustrates a method according to certain embodiments. FIG. 5 illustrates a further method according to certain embodiments. The method of FIGS. 4 and 5 may be usable separately or in combination with one another. For example, the method of FIG. 4 may be a method performed by a serving network element and method of FIG. 5 may be a corresponding method performed by a user equipment served by the serving network element.

As shown in FIG. 4, a method can include, at 410, informing, by a network element, a user equipment regarding at least one resource configured to a reference signal for a second radio access network. The user equipment can be configured to operate in a first radio access network different from the second radio access network. The informing can include indicating that the user equipment is permitted to use the reference signal. The method can also include, at 430, transmitting the reference signal in the second radio access network using the at least one resource. The informing can include providing a one-bit indication regarding reserved resources, for example, in DCI.

The reference signal can be a cell-specific reference signal for the second radio access network. The informing can include indicating to the user equipment that the reference signal is usable by the user equipment as a demodulation reference signal. As another option, the informing can include indicating to the user equipment that the reference signal is usable by the user equipment as a channel state information reference signal.

The method can further include, at 420, providing, by the network element to the user equipment, at least one parameter to generate a comparative reference signal for comparison to the reference signal transmitted using the at least one resource.

It is noted that FIG. 4 is provided as one example embodiment of a method or process. However, certain embodiments are not limited to this example, and further examples are possible as discussed elsewhere herein.

FIG. 5 illustrates a further method according to certain embodiments. As shown in FIG. 5, the method can include, at 510, receiving, at a user equipment from a network element, information regarding at least one resource configured to a reference signal for a second radio access network. This can be the same information provided at 410 in FIG. 4. In FIG. 5, as in FIG. 4, the user equipment can be configured to operate in a first radio access network different from the second radio access network. The information can indicate that the user equipment is permitted to use the reference signal.

The method can also include, at 530, receiving the reference signal in the second radio access network using the at least one resource. The reference signal can be a cell-specific reference signal for the second radio access network. This can be the same reference signal sent at 430 in FIG. 4.

As shown in FIG. 5, the method can also include, at 540, processing, by the user equipment, the reference signal as a demodulation reference signal. As another option, the method can include, at 545, processing, by the user equipment, the reference signal as a channel state information reference signal.

The method can also include, at 520, receiving, at the user equipment from the network element, at least one parameter. This can be the same parameter(s) sent at 420 in FIG. 4.

As further shown in FIG. 5, the method can also include, at 525, generating, using the at least one parameter, a comparative reference signal. The method can further include, at 535, comparing the received reference signal to the generated reference signal.

At 550, the method can further include applying cell-specific reference signal filter for channel estimation in addition to a channel estimation filter.

As another option, at 555, the method can also include applying machine learning to perform channel estimation based on the reference signal.

The first radio access network and the second radio access network in FIGS. 4 and 5 can be configured to dynamically share spectrum.

It is noted that FIG. 5 is provided as one example embodiment of a method or process. However, certain embodiments are not limited to this example, and further examples are possible as discussed elsewhere herein.

Figure 6A:
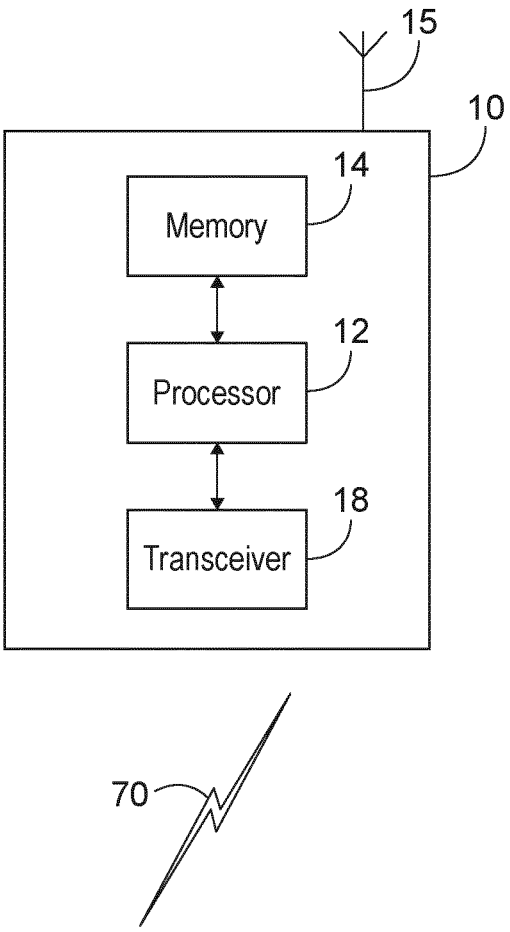
FIG. 6A illustrates an example block diagram of an apparatus, according to an embodiment.

FIG. 6A illustrates an example of an apparatus 10 according to an embodiment. In an embodiment, apparatus 10 may be a node, host, or server in a communications network or serving such a network. For example, apparatus 10 may be a network node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may comprise an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 6A.

As illustrated in the example of FIG. 6A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 6A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of global system for mobile communications (GSM), narrow band Internet of Things (NB-IoT), LTE, 5G, WLAN, Bluetooth (BT), Bluetooth Low Energy (BT-LE), near-field communication (NFC), radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, relay node, WLAN access point, satellite, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 1-5, or any other method described herein. In some embodiments, as discussed herein, apparatus 10 may be configured to perform a procedure relating to providing overhead impact mitigation in dynamic spectrum sharing, for example.

Figure 6B:
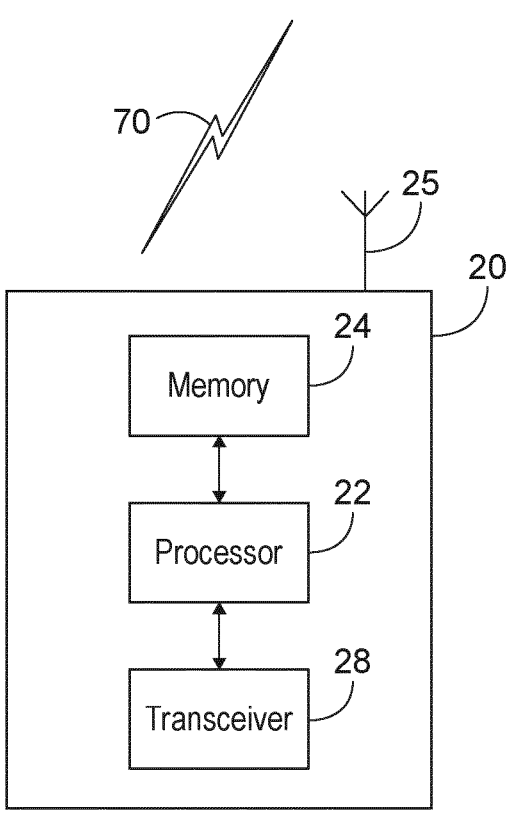
FIG. 6B illustrates an example block diagram of an apparatus, according to an embodiment.

FIG. 6B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 6B.

As illustrated in the example of FIG. 6B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 6B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIGS. 1-5, or any other method described herein. For example, in an embodiment, apparatus 20 may be controlled to perform a process relating to providing overhead impact mitigation in dynamic spectrum sharing, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of any of the operations discussed herein.

In view of the foregoing, certain example embodiments provide several technological improvements, enhancements, and/or advantages over existing technological processes and constitute an improvement at least to the technological field of wireless network control and/or management. Certain embodiments may have various benefits and/or advantages. For example, when the LTE CRS is used to enhance channel-estimation-based NR DMRS, it may be possible to reduce the utilization of additional DMRS for NR transmission in scenarios of high-speed NR UEs. In such scenarios, it may also be possible to enhance the NR PDSCH demodulation performance. Either of these benefits may individually or in combination result in a higher throughput. For another example, when the LTE CRS is used to replace or supplement NR CSI-RS signals, it may be possible to reduce the cell signaling overhead. It may also be possible, in such scenarios, to enable fast secondary cell (SCell) activation.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to example embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

An apparatus can include at least one processor and at least one memory including computer program instructions. The at least one memory and the computer program instructions can be configured to, with the at least one processor, cause the apparatus at least to perform informing, by a network element, a user equipment regarding at least one resource configured to a reference signal for a second radio access network. The user equipment can be configured to operate in a first radio access network different from the second radio access network. The informing can include indicating that the user equipment is permitted to use the reference signal. The at least one memory and the computer program instructions can also be configured to, with the at least one processor, cause the apparatus at least to perform transmitting the reference signal in the second radio access network using the at least one resource.

The reference signal can be a cell-specific reference signal for the second radio access network.

The informing can include indicating to the user equipment that the reference signal is usable by the user equipment as a demodulation reference signal.

The informing can include indicating to the user equipment that the reference signal is usable by the user equipment as a channel state information reference signal.

The at least one memory and the computer program instructions can also be configured to, with the at least one processor, cause the apparatus at least to perform providing, by the network element to the user equipment, at least one parameter to generate a comparative reference signal for comparison to the reference signal transmitted using the at least one resource.

The informing can include providing a one-bit indication regarding reserved resources.

An apparatus can include at least one processor and at least one memory including computer program instructions. The at least one memory and the computer program instructions can be configured to, with the at least one processor, cause the apparatus at least to perform receiving, at a user equipment from a network element, information regarding at least one resource configured to a reference signal for a second radio access network. The user equipment can be configured to operate in a first radio access network different from the second radio access network. The information can indicate that the user equipment is permitted to use the reference signal. The at least one memory and the computer program instructions can also be configured to, with the at least one processor, cause the apparatus at least to perform receiving the reference signal in the second radio access network using the at least one resource.

The reference signal can be a cell-specific reference signal for the second radio access network.

The at least one memory and the computer program instructions can also be configured to, with the at least one processor, cause the apparatus at least to perform processing, by the user equipment, the reference signal as a demodulation reference signal.

The at least one memory and the computer program instructions can also be configured to, with the at least one processor, cause the apparatus at least to perform processing, by the user equipment, the reference signal as a channel state information reference signal.

The at least one memory and the computer program instructions can also be configured to, with the at least one processor, cause the apparatus at least to perform receiving, at the user equipment from the network element, at least one parameter. The at least one memory and the computer program instructions can further be configured to, with the at least one processor, cause the apparatus at least to perform generating, using the at least one parameter, a comparative reference signal. The at least one memory and the computer program instructions can additionally be configured to, with the at least one processor, cause the apparatus at least to perform comparing the received reference signal to the generated reference signal.

The at least one memory and the computer program instructions can also be configured to, with the at least one processor, cause the apparatus at least to perform applying cell-specific reference signal filter for channel estimation in addition to a channel estimation filter.

The at least one memory and the computer program instructions can also be configured to, with the at least one processor, cause the apparatus at least to perform applying machine learning to perform channel estimation based on the reference signal.

The first radio access network and the second radio access network can be configured to dynamically share spectrum.

A method can include informing, by a network element, a user equipment regarding at least one resource configured to a reference signal for a second radio access network. The user equipment can be configured to operate in a first radio access network different from the second radio access network. The informing can include indicating that the user equipment is permitted to use the reference signal. The method can also include transmitting the reference signal in the second radio access network using the at least one resource.

The reference signal can include a cell-specific reference signal for the second radio access network.

The informing can include indicating to the user equipment that the reference signal is usable by the user equipment as a demodulation reference signal.

The informing can include indicating to the user equipment that the reference signal is usable by the user equipment as a channel state information reference signal.

The method can also include providing, by the network element to the user equipment, at least one parameter to generate a comparative reference signal for comparison to the reference signal transmitted using the at least one resource.

The informing can include providing a one-bit indication regarding reserved resources.

A method can include receiving, at a user equipment from a network element, information regarding at least one resource configured to a reference signal for a second radio access network. The user equipment can be configured to operate in a first radio access network different from the second radio access network. The information can indicate that the user equipment is permitted to use the reference signal. The method can also include receiving the reference signal in the second radio access network using the at least one resource.

The reference signal can be a cell-specific reference signal for the second radio access network.

The method can also include processing, by the user equipment, the reference signal as a demodulation reference signal.

The method can further include processing, by the user equipment, the reference signal as a channel state information reference signal.

The method can also include receiving, at the user equipment from the network element, at least one parameter. The method can further include generating, using the at least one parameter, a comparative reference signal. The method can additionally include comparing the received reference signal to the generated reference signal.

The method can also include applying cell-specific reference signal filter for channel estimation in addition to a channel estimation filter.

The method can also include applying machine learning to perform channel estimation based on the reference signal.

The first radio access network and the second radio access network can be configured to dynamically share spectrum.

An apparatus can include means for informing, by a network element, a user equipment regarding at least one resource configured to a reference signal for a second radio access network. The user equipment can be configured to operate in a first radio access network different from the second radio access network. The informing can include indicating that the user equipment is permitted to use the reference signal. The apparatus can also include means for transmitting the reference signal in the second radio access network using the at least one resource.

The reference signal can be a cell-specific reference signal for the second radio access network.

The informing can include indicating to the user equipment that the reference signal is usable by the user equipment as a demodulation reference signal.

The informing can include indicating to the user equipment that the reference signal is usable by the user equipment as a channel state information reference signal.

The apparatus can also include means for providing, by the network element to the user equipment, at least one parameter to generate a comparative reference signal for comparison to the reference signal transmitted using the at least one resource.

The informing can include providing a one-bit indication regarding reserved resources.

An apparatus can include means for receiving, at a user equipment from a network element, information regarding at least one resource configured to a reference signal for a second radio access network. The user equipment can be configured to operate in a first radio access network different from the second radio access network. The information can indicate that the user equipment is permitted to use the reference signal. The apparatus can also include means for receiving the reference signal in the second radio access network using the at least one resource.

The reference signal can be a cell-specific reference signal for the second radio access network.

The apparatus can also include means for processing, by the user equipment, the reference signal as a demodulation reference signal.

The apparatus can further include means for processing, by the user equipment, the reference signal as a channel state information reference signal.

The apparatus can also include means for receiving, at the user equipment from the network element, at least one parameter. The apparatus can further include means for generating, using the at least one parameter, a comparative reference signal. The apparatus can additionally include means for comparing the received reference signal to the generated reference signal.

The apparatus can also include means for applying cell-specific reference signal filter for channel estimation in addition to a channel estimation filter.

The apparatus can also include means for applying machine learning to perform channel estimation based on the reference signal.

The first radio access network and the second radio access network can be configured to dynamically share spectrum.

| PARTIAL GLOSSARY: | |
| --- | --- |
| CE | Channel Estimation |
| CRS | Cell-specific Reference Signal |
| DCI | Downlink Control Information |
| DL | Downlink |
| DMRS | DeModulation Reference Signal |
| DSS | Dynamic Spectrum Sharing |
| FL | Front Loaded |
| IE | Information Element |
| LTE | Long Term Evolution |
| MAC-CE | Medium Access Control Control Element |
| MIMO | Multiple-Input Multiple-Output |
| NR | New Radio |
| OFDM | Orthogonal Frequency Division Multiplexing |
| PDSCH | Physical Downlink Shared Channel |
| PRB | Physical Resource Block |
| RRC | Radio Resource Control |
| SU-MIMO | Single User Multiple Input Multiple Output |
| UE | User Equipment |
| 3GPP | 3rd Generation Partnership Project |
| BM | Beam Management |
| CSI-RS | Channel State Information Reference Signal |
| SCell | Secondary cell |

We claim:

1. A New Radio (NR) user equipment for reducing cell signaling overhead, the NR user equipment comprising:
   at least one processor; and

at least one memory including computer program instructions, wherein the at least one memory and the computer program instructions are configured to, with the at least one processor, cause the NR user equipment to perform:

receiving, at the NR user equipment from a transmission over an entire long term evolution (LTE) network bandwidth when no LTE user equipment is currently scheduled, information regarding resources configured to an LTE cell-specific reference signal (CRS), the information being needed to generate LTE CRSs and to know the resources wherein the LTE CRSs are mapped using radio resource control (RRC), wherein the NR user equipment is configured to operate in a NR network different from the LTE network, wherein the information further indicates that the NR user equipment is permitted to use the LTE CRS, wherein the resources comprise: LTE physical downlink control channel (PDCCH), LTE CRS, LTE physical downlink shared channel (PDSCH), NR synchronization signal block (SSB), NR Channel State Information Reference Signals (NR CSI-RS), NR PDCCH control resource set (CORESET), and NR PDSCH demodulation reference signal (DMRS);

receiving, by the NR user equipment, the LTE CRS in the LTE network using one or more of the resources;

processing, by the NR user equipment, the LTE CRS as a channel state information reference signal;

using, by the NR user equipment, the LTE CRS in addition to native NR CSI-RS for tracking;

applying, by the NR user equipment, an LTE CRS filter for channel estimation for LTE signals in addition to an NR channel estimation filter; and using, by the NR user equipment, the LTE CRS as the CSI-RS for channel acquisition by measuring channel state criteria requested by a network based on the LTE CRS transmission, wherein the NR network and the LTE network are configured to dynamically share spectrum.

2. The NR user equipment of claim 1, wherein the at least one memory and the computer program instructions are configured to, with the at least one processor, cause the NR user equipment at least to perform:

receiving, at the NR user equipment, at least one parameter;

generating, using the at least one parameter, a comparative reference signal; and comparing the received reference signal to the generated reference signal.

3. The NR user equipment of claim 2, wherein the at least one memory and the computer program instructions are configured to, with the at least one processor, cause the NR user equipment at least to perform:

applying machine learning to perform channel estimation based on the reference signal.

4. The NR user equipment of claim 3, wherein the LTE CRS is used instead of the NR CSI-RS.

5. The NR user equipment of claim 4, wherein the at least one memory and the computer program instructions are configured to, with the at least one processor, cause the NR user equipment at least to perform:

using, by the NR user equipment, the LTE CRS to enhance channel estimation-based NR demodulation reference signal (DMRS)-based channel estimation without requiring any new reference signal and without requiring the NR user equipment to do wideband channel estimation.

6. The NR user equipment of claim 5, wherein the LTE CRS serves as a temporary radio signal for fast SCell activation.

7. The NR user equipment of claim 6, wherein the resources, occupied by the LTE CRS, are reserved in an NR cell.

8. A system for reducing cell signaling overhead, the system comprising:

a new radio (NR) user equipment;

at least one processor; and at least one memory including computer program instructions, wherein the at least one memory and the computer program instructions are configured to, with the at least one processor, cause the NR user equipment to perform:

receiving, at the NR user equipment from a transmission over an entire long term evolution (LTE) network bandwidth when no LTE user equipment is currently scheduled, information regarding resources configured to an LTE cell-specific reference signal (CRS), the information being needed to generate LTE CRSs and to know the resources wherein the LTE CRSs are mapped using radio resource control (RRC), wherein the NR user equipment is configured to operate in a NR network different from the LTE network, wherein the information further indicates that the NR user equipment is permitted to use the LTE CRS, wherein the resources comprise: LTE physical downlink control channel (PDCCH), LTE CRS, LTE physical downlink shared channel (PDSCH), NR synchronization signal block (SSB), NR Channel State Information Reference Signals (NR CSI-RS), NR PDCCH control resource set (CORESET), and NR PDSCH demodulation reference signal (DMRS);

receiving, by the NR user equipment, the LTE CRS in the LTE network using one or more of the resources;

processing, by the NR user equipment, the LTE CRS as a channel state information reference signal;

using, by the NR user equipment, the LTE CRS in addition to native NR CSI-RS for tracking;

applying, by the NR user equipment, an LTE CRS filter for channel estimation for LTE signals in addition to an NR channel estimation filter; and using, by the NR user equipment, the LTE CRS as the CSI-RS for channel acquisition by measuring channel state criteria requested by a network based on the LTE CRS transmission, wherein the NR network and the LTE network are configured to dynamically share spectrum.

9. The system of claim 8, wherein the at least one memory and the computer program instructions are configured to, with the at least one processor, cause the NR user equipment at least to perform:

receiving, at the NR user equipment, at least one parameter;

generating, using the at least one parameter, a comparative reference signal; and comparing the received reference signal to the generated reference signal.

10. The system of claim 9, wherein the at least one memory and the computer program instructions are configured to, with the at least one processor, cause the NR user equipment at least to perform:

applying machine learning to perform channel estimation based on the reference signal.

11. The system of claim 10, wherein the LTE CRS is used instead of the NR CSI-RS.

12. The system of claim 11, wherein the at least one memory and the computer program instructions are configured to, with the at least one processor, cause the NR user equipment at least to perform:

using, by the NR user equipment, the LTE CRS to enhance channel estimation-based NR demodulation reference signal (DMRS)-based channel estimation without requiring any new reference signal and without requiring the NR user equipment to do wideband channel estimation.

13. The system of claim 12, wherein the LTE CRS serves as a temporary radio signal for fast SCell activation.

14. The system of claim 12, wherein the resources, occupied by the LTE CRS, are reserved in an NR cell.

15. A method for reducing cell signaling overhead, the method comprising:

receiving, at a NR user equipment from a transmission over an entire long term evolution (LTE) network bandwidth when no LTE user equipment is currently scheduled, information regarding resources configured to an LTE cell-specific reference signal (CRS), the information being needed to generate LTE CRSs and to know the resources wherein the LTE CRSs are mapped using radio resource control (RRC), wherein the NR user equipment is configured to operate in a NR network different from the LTE network, wherein the information further indicates that the NR user equipment is permitted to use the LTE CRS, wherein the resources comprise: LTE physical downlink control channel (PDCCH), LTE CRS, LTE physical downlink shared channel (PDSCH), NR synchronization signal block (SSB), NR Channel State Information Reference Signals (NR CSI-RS), NR PDCCH control resource set (CORESET), and NR PDSCH demodulation reference signal (DMRS);

receiving, by the NR user equipment, the LTE CRS in the LTE network using one or more of the resources;

processing, by the NR user equipment, the LTE CRS as a channel state information reference signal;

using, by the NR user equipment, the LTE CRS in addition to native NR CSI-RS for tracking;

applying, by the NR user equipment, an LTE CRS filter for channel estimation for LTE signals in addition to an NR channel estimation filter; and using, by the NR user equipment, the LTE CRS as the CSI-RS for channel acquisition by measuring channel state criteria requested by a network based on the LTE CRS transmission, wherein the NR network and the LTE network are configured to dynamically share spectrum.

16. The method of claim 15, further comprising:

receiving, at the NR user equipment, at least one parameter;

generating, using the at least one parameter, a comparative reference signal; and comparing the received reference signal to the generated reference signal.

17. The method of claim 16, further comprising:

applying machine learning to perform channel estimation based on the reference signal.

18. The method of claim 17, wherein the LTE CRS is used instead of the NR CSI-RS.

19. The method of claim 18, further comprising:

using, by the NR user equipment, the LTE CRS to enhance channel estimation-based NR demodulation reference signal (DMRS)-based channel estimation without requiring any new reference signal and without requiring the NR user equipment to do wideband channel estimation.

20. The method of claim 19, wherein the LTE CRS serves as a temporary radio signal for fast SCell activation, and wherein the resources, occupied by the LTE CRS, are reserved in an NR cell.

* * * * *